United States Patent
Wilcox

(10) Patent No.: US 6,532,547 B1
(45) Date of Patent: Mar. 11, 2003

(54) REDUNDANT PERIPHERAL DEVICE SUBSYSTEM

(75) Inventor: Jeffrey A. Wilcox, Bourne, MA (US)

(73) Assignee: EMC Corporation, Hopkinton, MA (US)

( * ) Notice: Subject to any disclaimer, the term of this patent is extended or adjusted under 35 U.S.C. 154(b) by 1550 days.

(21) Appl. No.: 08/491,467

(22) Filed: Jun. 16, 1995

(51) Int. Cl.[7] .......... H02H 3/05; H03K 19/003; G06F 13/00
(52) U.S. Cl. .......... 714/5; 714/42; 714/44; 710/72; 710/100
(58) Field of Search .......... 395/182.07, 183.2, 395/183.19, 182.01, 182.03, 182.02, 182.04, 185.09

(56) References Cited

U.S. PATENT DOCUMENTS

| | | | |
|---|---|---|---|
| 4,456,965 A | * 6/1984 | Graber et al. | 395/308 |
| 4,663,706 A | * 5/1987 | Allen et al. | 395/200.13 |
| 4,870,643 A | 9/1989 | Bultman et al. | 371/11.1 |
| 5,274,645 A | 12/1993 | Idleman et al. | 371/10.1 |
| 5,337,319 A | 8/1994 | Furukawa et al. | 371/11.1 |
| 5,341,381 A | 8/1994 | Fuller | 371/10.1 |
| 5,349,679 A | * 9/1994 | Nakayama | 395/800 |

* cited by examiner

Primary Examiner—Thomas Lee
Assistant Examiner—Chun Cao
(74) Attorney, Agent, or Firm—David N. Caracappa; John M. Gunther; Krishnendu Gupta

(57) ABSTRACT

A redundant peripheral device subsystem in a computer system is disclosed including first and second peripheral device controllers. First and second peripheral device busses are coupled to the first and second peripheral device controllers, respectively. A controllable switch is coupled between the first and second peripheral device busses. The controllable switch either isolates the first and second peripheral device busses from each other, or joins them into a single peripheral device bus.

25 Claims, 1 Drawing Sheet

REDUNDANT PERIPHERAL DEVICE SUBSYSTEM

The present invention relates to a redundant peripheral device subsystem on a computer system.

Current computer systems provide for the attachment of peripheral devices. Peripheral devices are often attached to the computer system by being connected to peripheral device busses, such as known SCSI or ESDI busses. A peripheral device controller is coupled between the computer system and the peripheral device bus to form a peripheral device subsystem. The peripheral device controller controls the operation of the peripheral devices on the peripheral device bus in response to instructions from the computer system. For example, computer systems usually include mass storage subsystems for storing and retrieving data. These mass storage subsystems usually are disk drive subsystems. It is known to couple a SCSI controller to the computer system and attach one or more disk drives to a SCSI bus which operates under the control of the SCSI controller.

It is often important that data be stored to and retrieved from these disk drive systems reliably, meaning that the data be available, even if a disk drive in the subsystem fails. In order to provide reliable data storage and retrieval, various schemes involving error correction encoding the data, partitioning the codewords, and storing the partitioned codewords on a plurality of different disk drives in the disk drive subsystem have been developed. These schemes are subsumed under the term RAID (redundant array of inexpensive disks) and have provided a cost-effective means of protecting a computer system against the failure of a single disk drive.

Of the various RAID schemes, RAID 5 has been shown to be the most effective scheme to date. In the RAID 5 scheme, three or more disk drives are used in the disk drive subsystem, and the equivalent storage space of one drive is dedicated to storing odd parity based on the data stored on the other drives in the subsystem. This scheme allows reconstruction of the data, when a single disk drive fails, from the data stored on the other, still functioning, drives.

Because two or more disk drives are simultaneously involved in all data storage and retrieval operations in the RAID 5 scheme, RAID 5 subsystems have been designed which have two or more SCSI busses respectively controlled by as many SCSI controllers. The disk drives are distributed as equally as possible among the available SCSI busses. The parallel operation of multiple SCSI controllers improves the performance of such a subsystem. While the disk drive subsystem is protected against the failure of a single disk drive, it is possible for a SCSI controller to fail too. If a SCSI controller fails, the disk drives coupled to that controller are made unavailable, and the disk drive subsystem will fail.

Several RAID 5 approaches have been proposed to deal with the possibility of a SCSI controller failure. A first approach is to ignore the chance of SCSI controller failure by assuming that a SCSI controller failure is unlikely. This approach adds no hardware, and thus no cost to the RAID 5 disk drive system. However, such an approach results in a subsystem which has a single point of failure—the failure of a SCSI controller.

Another RAID 5 approach is to provide a second, redundant, SCSI controller for each SCSI bus. That is, two SCSI controllers will be attached to the first SCSI bus, two SCSI controllers will be attached to the second SCSI bus, and so on. This approach allows for recovery from the failure of a single SCSI controller. However, it effectively doubles the cost of the SCSI interface by requiring two SCSI controllers for each SCSI bus instead of only one. There are two possible modes of operation of such a subsystem. In a first operating mode, both SCSI controllers cooperate to control the disk drives attached to their SCSI bus. The simultaneous control of a single SCSI bus by two SCSI controllers is a complex task. Software for controlling the simultaneous operation of both SCSI controllers is much more complex than that for a system in which a single SCSI controller controls a single SCSI bus. Such software is expensive to design and implement, and is less reliable in operation. In a second operating mode, one of the SCSI controllers remain dormant. This is a waste of its capability and cost, however.

Another RAID 5 approach is to provide a second, redundant, disk subsystem controller—that is, two complete disk drive controller boards. In this approach, each controller board includes multiple SCSI controllers. The first SCSI controller on each controller board is coupled in common to the first SCSI bus, the second SCSI controller on each controller board is coupled in common to the second SCSI bus, and so on. Each controller board must further include circuitry for establishing a communications path with the other controller board. Such an approach allows for a very high level of protection because everything in the disk drive subsystem has a duplicate capable of taking over operation in the event of a failure. However, this approach is very expensive. In addition, the overhead data processing and transfer between controller boards is much greater in this approach than in other approaches. Furthermore, should one controller board fail, a portion of the failed controller board must remain sufficiently operative to communicate with the other controller board to transfer operation to the other controller board. Again, as described above, either complex control software must be developed for controlling simultaneous operation of both SCSI controllers, complicated further by the intercontroller communications which must take place in this approach, or one of the controllers must remain dormant during normal operations.

Another RAID 5 approach is to provide a separate SCSI controller for each of the disk drives in the disk drive subsystem, all coupled to the computer system. In this approach, the method of recovery from the failure of a single SCSI controller is identical to the method of recovery from the failure of a single disk drive. This approach also provides a substantial performance advantage because all disk drives may be controlled simultaneously in normal operations, and all of the SCSI controllers are involved in normal operations. However, this approach is expensive because of the number of SCSI controllers required.

A peripheral device subsystem is desirable which provides for recovery from the failure of a single peripheral device controller, which does not substantially increase the cost or operational complexity of the peripheral device subsystem, and which does not include expensive elements which remain dormant during normal operations.

In accordance with principles of the present invention, a redundant peripheral device subsystem in a computer system comprises first and second peripheral device controllers. First and second peripheral device busses are coupled to the first and second peripheral device controllers, respectively. A controllable switch is coupled between the first and second peripheral device busses. The controllable switch either isolates the first and second peripheral device busses from each other, or joins them into a single peripheral device bus.

A peripheral device subsystem according to the present invention allows for recovery from the failure of a single peripheral device controller by joining the two peripheral device busses into a single bus which may then be controlled by the remaining operative peripheral device controller. During normal operations, both peripheral device controllers are operating each controlling it's own peripheral device bus. The only added hardware is the controllable switch, which may be constructed inexpensively, as will be described in more detail below. A SCSI RAID 5 mass storage system according to the present invention provides for reliable recovery of the stored data in the event of the failure of a SCSI controller.

Figure 1:
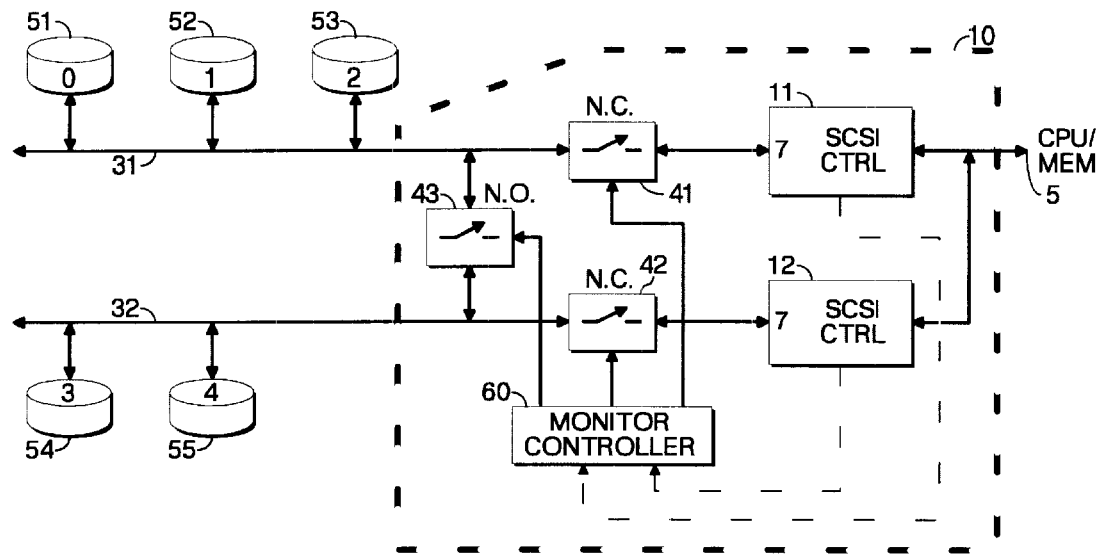
FIG. 1 is a block diagram of a peripheral device subsystem according to the present invention.

FIG. 1 is a block diagram of a peripheral device subsystem according to the present invention. In FIG. 1 a peripheral device subsystem is illustrated and described in terms of a RAID 5 disk drive subsystem using five SCSI bus disk drives attached to two SCSI busses. One skilled in the art will understand, however, that the present invention is applicable to any peripheral device subsystem in which a plurality of peripheral devices are attached to one or more pairs of peripheral device busses. For example, the present invention may be used in any mass storage subsystem containing a plurality of disk drives attached to any number of pairs of disk drive peripheral busses such as SCSI or ESDI busses. More specifically, the present invention may be used in any RAID 5 disk drive subsystem containing three or more disk drives coupled to one or more pairs of SCSI busses.

In FIG. 1 digital signal lines, which may include paths for single and multibit digital signals and clock signals, are illustrated as single lines with arrows indicating signal flow direction. In order to simplify the figure, various other signal lines, carrying data, clocking and possibly analog signals, have been omitted from the figure. One skilled in the art of peripheral device subsystem design will understand what further signals are required, and how to generate and distribute those signals. Furthermore, other elements are present in a peripheral device subsystem, but have not been illustrated. Specifically, the illustrated peripheral device subsystem includes a processor (termed a resident processor), with associated memory, which controls the operation of the subsystem in a known manner. One skilled in the art of peripheral device subsystem design will understand what further elements are required, and how to design and implement those elements and interconnect them with the illustrated elements.

In FIG. 1, a computer system (not shown), which includes a central processing unit (CPU) and a memory subsystem, is coupled to a bidirectional terminal 5 of the peripheral device subsystem. The bidirectional terminal 5 is coupled to respective bidirectional terminals of first and second SCSI controllers, 11 and 12. The first SCSI controller 11 is coupled to a first SCSI bus 31 via a first controllable switch 41. A first plurality of three disk drives, 51, 52 and 53, are also coupled to the first SCSI bus 31. The second SCSI controller 12 is coupled to a second SCSI bus 32 via a second controllable switch 42. A second plurality of two disk drives, 54 and 55, are also coupled to the second SCSI bus 32. A third controllable switch 43 is coupled between the first SCSI bus 31 and the second SCSI bus 32. A monitor controller 60 includes respective control output terminals coupled to control input terminals of the first, second and third controllable switches, 41, 42 and 43. The first, second and third controllable switches, 41, 42 and 43, may each be implemented as a plurality of bidirectional FET switches, one for each signal line in the SCSI bus, controlled by a common control signal terminal. For example, a 74QS3384 10-bit FET switch integrated circuit package, manufactured by Quality Semiconductor, Inc., Santa Clara, Calif., USA, may be used to implement the first, second and third controllable switches, 41, 42 and 43.

The first and second SCSI controllers, 11 and 12, the first, second and third controllable switches, 41, 42 and 43, and the monitor controller 60 are all implemented on a single SCSI controller board 10. This board has a single connection to the CPU via bidirectional terminal 5, and two SCSI bus terminals coupled to the first and second SCSI busses, 31 and 32, respectively.

The SCSI busses, 31 and 32, operate in a known manner. For example, what is known as a narrow SCSI bus, may have up to eight peripheral devices attached, each having a unique address from 0 to 7. Similarly, what is known as a wide SCSI bus, may have up to 16 peripheral devices attached, each having a unique address from 0 to 15. In both of the SCSI busses, the peripheral device controller is, itself, considered to be a peripheral device, and requires a unique address. Other peripheral device busses may have other addressing schemes and different maximum numbers of devices which may be attached to that peripheral device bus.

The addresses of the peripheral devices may be set by physically setting the position of address switches or jumpers in the electronic interface circuitry associated with each disk drive and each SCSI controller. The addresses may also be set electronically in response to a program executed in the resident processor (not shown) at the time the subsystem is powered on. When set in this manner, an address may be changed dynamically by the resident processor. In addition, some addresses may be set physically by switches or jumpers and others set electronically by the program executed on the resident processor.

The SCSI busses 31 and 32 illustrated in FIG. 1 are narrow SCSI busses. The numbers within the disk drives 51–55 and within the SCSI controllers 11 and 12 indicate the SCSI bus address of that component. The first SCSI controller 11 has the address 7, disk drive 51 has the address 0, disk drive 52 has the address 1 and disk drive 53 has the address 2. The second SCSI controller 12 also has the address 7, disk drive 54 has the address 3 and disk drive 55 has the address 4. In order for the SCSI bus to operate properly, it is imperative that no two devices on the same SCSI bus have the same address.

In operation, the monitor controller 60 produces respective control signals to condition the controllable switches 41 and 42 to be normally closed (N.C.) and the controllable switch 43 to be normally open (N.O.). In this configuration, the first SCSI bus 31 is isolated from the second SCSI bus 32. When configured in this manner, the disk drive subsystem illustrated in FIG. 1 operates in the same manner as the simple RAID 5 disk drive controller of the type described above. That is, the first SCSI controller 11 is coupled to the first SCSI bus 31, to which a first plurality of three disk drives, 51, 52 and 53, have been attached; and the second SCSI controller 12 is coupled to the second SCSI bus 32 to which a second plurality of two disk drives, 54 and 55, have been attached. So long as both the first 11 and second 12 SCSI controller operate normally, this configuration is maintained. The failure of a single one of the disk drives 51–55 is handled in the manner known for RAID 5 subsystems. The data previously stored in the disk drive subsystem is reconstructed from the data stored on the still operating disk drives and returned to the computer system.

The failure of a SCSI controller, 11 or 12, is handled in the following manner. The monitor controller 60, in cooperation with the resident processor (not shown), monitors the operation of the first and second SCSI controllers, 11 and 12, as illustrated by the dashed lines. When the monitor controller 60 detects a malfunction of a SCSI controller (11,12), the subsystem is reconfigured to join the first SCSI bus 31 to the second SCSI bus 32 to form a single SCSI bus. This permits the still operating SCSI controller to control all five of the disk drives 51–55. To do this, the monitor controller 60 sends a control signal to the third controllable switch 43 conditioning it to close, connecting the first SCSI bus 31 to the second SCSI bus 32 and forming a single SCSI bus.

It is possible for a SCSI controller to fail in such a manner that it freezes the SCSI bus to which it is attached, rendering that SCSI bus inoperative. To prevent this type of failure from preventing operation of the disk drive subsystem by the other SCSI controller, when a SCSI controller is determined to be malfunctioning, it is isolated from the rest of the subsystem. For example, if the first SCSI controller 11 is determined to be malfunctioning, the monitor controller 60 sends a control signal to the first controllable switch 41 conditioning it to open. This effectively isolates the malfunctioning first SCSI controller 11 from the joined SCSI bus formed by the closing of the third controllable switch 43. Similarly, if the second SCSI controller 12 is determined to be malfunctioning, the monitor controller 60 sends a control signal to the second controllable switch 42 conditioning it to open, isolating the second SCSI controller 12 from the joined SCSI bus.

A disk drive subsystem operating in this manner provides for recovery from the failure of a single SCSI controller by joining the two SCSI busses into a single SCSI bus which may be controlled by the still functioning SCSI controller. Such a subsystem requires only the inclusion of a controllable switch coupling the two SCSI busses. To provide further reliability, two other controllable switches are provided to isolate a malfunctioning SCSI controller from the joined bus, in case the failure has frozen its SCSI bus interface circuits. Controllable switches implemented as FET switches are relatively inexpensive, especially compared to the other approaches, described above, which require additional SCSI controllers. Finally, both SCSI controllers are active during normal operations, each controlling a separate SCSI bus. But, even though both SCSI controllers are operating simultaneously, there is no need for complex control software because they are controlling separate SCSI busses. A RAID 5 disk drive subsystem constructed in this manner can operate reliably not only when a disk drive fails, but also when a SCSI controller fails.

The SCSI bus addresses assigned to the disk drives and controllers on each pair of SCSI busses are selected so that in the event the two SCSI busses are joined, the devices on the joined bus will have unique bus addresses. The bus addresses of the illustrated five disk drives 51–55 have been selected so that they are unique whether they are operating on separate SCSI busses isolated from the other one, or on a single joined SCSI bus. Both of the SCSI controllers 11 and 12 are assigned the SCSI bus address 7, which is the address of the SCSI device having the highest bus priority. But in the event that one of the SCSI controllers (11,12) fails, the failed SCSI controller will be isolated from the joined SCSI bus, so that only one controller with address 7 will be attached to the joined SCSI bus. In no event will both SCSI controllers (11,12) be attached to the same SCSI bus at the same time, thus, there will be no address conflict between them can arise.

The smallest RAID 5 disk drive subsystem includes three disk drives. In a disk drive subsystem according to the present invention, two disk drives are attached to a first SCSI bus and the third disk drive to a second SCSI bus. The disk drives are assigned mutually different bus addresses, and both SCSI controllers are assigned bus addresses of 7, as in FIG. 1. As described above, a maximum of eight peripheral devices (including a controller) may be attached to a narrow SCSI bus, and it is imperative that each have a unique address. Thus, in a narrow SCSI bus subsystem, up to seven disk drives, each having a mutually different bus address, may be attached to any pair of SCSI busses which is to be joined in the event of a SCSI controller failure. Similarly, in a wide SCSI bus subsystem, up to 15 disk drives, each having a mutually different bus address, may be attached to any pair of SCSI busses. (Other peripheral device busses may have other addressing schemes.) In addition, there may be as many pairs of SCSI busses as are necessary to control the total number of disk drives required by the RAID 5 disk drive subsystem being implemented.

Figure 2:
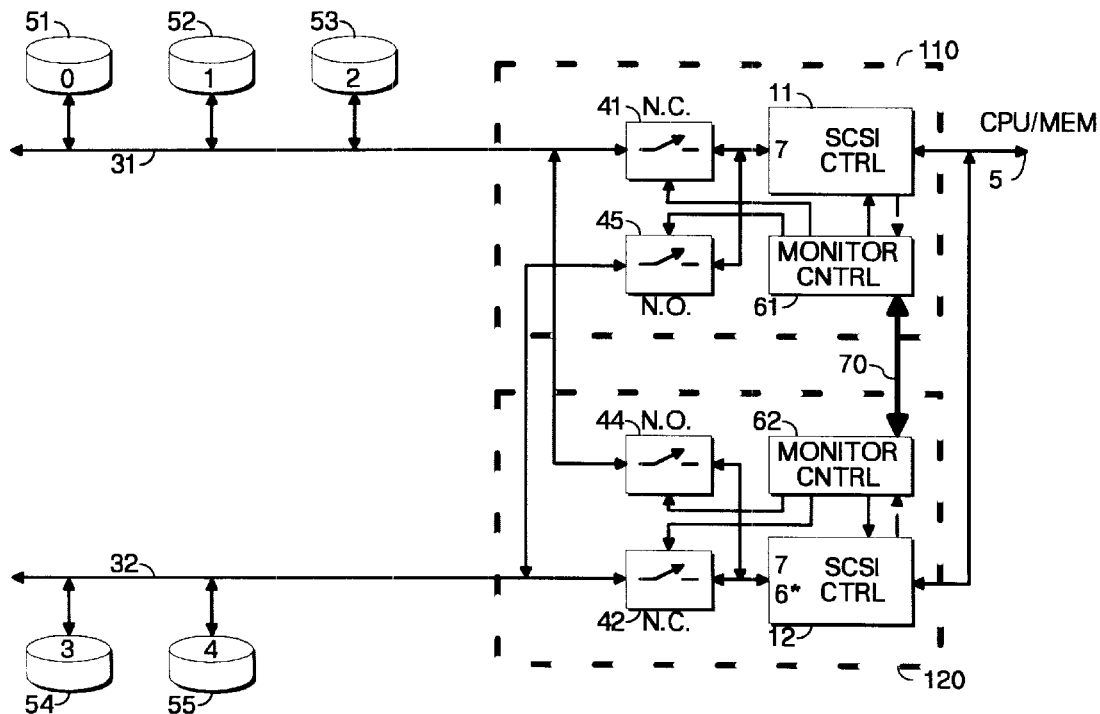
FIG. 2 is a block diagram of a peripheral device subsystem according to the present invention including two controller boards.

As was described above, a very high level of reliability may be achieved by providing redundant controller boards. In applications where this very high level of reliability is required, the present invention may still be used to minimize the expense of such an approach. FIG. 2 is a block diagram of a peripheral device subsystem according to the present invention including two controller boards. In FIG. 2, elements which are the same as those in FIG. 1 are designated by the same reference number and will not be described in detail.

In FIG. 2, a first controller board 110 has a first SCSI controller 11, which is coupled to a first SCSI bus 31 via a first controllable switch 41. A second controller board 120 has a second SCSI controller 12, which is coupled to a second SCSI bus 32 via a second controllable switch 42. The first controller board 110 further includes a third controllable switch 45 coupled between the first SCSI controller 11 and the second SCSI bus 32, and the second controller board 120 further includes a fourth controllable switch 44 coupled between the second SCSI controller 12 and the first SCSI bus 31. The first controller board 110 further includes a first monitor controller 61. The first monitor controller 61 is coupled to respective control terminals of the first (41) and third (45) controllable switches. A second monitor controller 62 in the second controller board 120 is coupled to respective control input terminals of the second (42) and fourth (44) controllable switches, and to the second SCSI controller 12. There is also an intercontroller communications path 70 between the first and second monitor controllers, 61 and 62, on the first and second controller boards, 110 and 120, respectively, illustrated by a thick arrow.

In normal operation, the first and second monitor controllers, 61 and 62, supply respective control signals to the first and second controllable switches, 41 and 42, to condition them to be normally closed (N.C.). At the same time, they supply respective control signals to the third and fourth controllable switches, 45 and 44, to condition them to be normally open (N.O.). When in this normal configuration, the first and second SCSI busses, 31 and 32, are isolated from each other; the first SCSI controller 11 is connected to the first SCSI bus 31 and the second SCSI controller 12 is connected to the second SCSI bus 32. In the normal configuration both controller boards, 110 and 120, and their resident SCSI controllers, 11 and 12, respectively, are active in data storage and retrieval operations, but controlling separate SCSI busses. As above, the failure of a single disk drive in the subsystem is handled in the known manner of RAID 5 disk drive subsystems.

The failure of a SCSI controller is handled in the following manner. If one of the monitor controllers, 61 and 62, detects that its SCSI controller, 11 and 12, respectively, is malfunctioning, it acts to isolate the malfunctioning SCSI controller from the SCSI busses 31 and 32, and communicates the failure to the monitor controller on the other controller board. The monitor controller on the other controller board joins the two SCSI busses to form a single SCSI bus, and connects its functioning SCSI controller simultaneously to the single joined SCSI bus. This functioning SCSI controller now takes over control of all the disk drives on the single SCSI bus.

For example, if the monitor controller 61 on the first controller board 110 detects that the first SCSI controller 11 is malfunctioning, it provides respective control signals to the first and third controllable switches, 41 and 45, to condition them both to open. This effectively isolates the malfunctioning SCSI controller 11 from the SCSI busses 31 and 32. The monitor controller 61 also sends a message via the intercontroller communications path 70 to the monitor controller 62 on the second controller board 120 informing it that the first SCSI controller 11 is malfunctioning. The monitor controller 62 provides respective control signals to the second and fourth controllable switches, 42 and 44, to condition them both to close. This effectively joins the first and second SCSI busses, 31 and 32, into a single SCSI bus through the series connection of the second and fourth controllable switches, 42 and 44, and allows the second SCSI controller 12 to control its operation.

Similarly, if the monitor controller 62 on the second controller board 120 detects that the second SCSI controller 12 is malfunctioning, it provides respective control signals to the second and fourth controllable switches, 42 and 44, to condition them both to open. This effectively isolates the malfunctioning SCSI controller 12 from the SCSI busses 31 and 32. The monitor controller 62 also sends a message via the intercontroller communications path 70 to the first monitor controller 61 informing it that the second SCSI controller 12 is malfunctioning. The monitor controller 61 provides respective control signals to the first and third controllable switches, 41 and 45, conditioning them both to close. This effectively joins the first and second SCSI busses, 31 and 32, into a single SCSI bus through the series connection of the first and third controllable switches, 41 and 45, and allows the first SCSI controller 11 to control its operation.

This mode of operation, and the constraints it imposes on the bus addresses of the attached disk drives and the number of disk drives which may be attached to respective pairs of SCSI busses, is similar to that described above with respect to FIG. 1, and will not be described in detail here. A RAID 5 disk drive subsystem implemented according to FIG. 2 can recover from either the failure of a single disk drive, or the failure of a single SCSI controller without losing data previously stored by the computer system.

In FIG. 2, there is one more possible mode of failure. A controllable switch could fail, either open or closed. For example, if the first controllable switch 41 in the first controller board 110 should fail open, then the first SCSI controller 11, which is operating normally, cannot connect to the first SCSI bus 31 through the malfunctioning first controllable switch 41. This failure may be recovered from by joining the first and second SCSI busses, 31 and 32, into a single SCSI bus using the remaining, operative, controllable switches, 42, 44 and 45, and allowing both SCSI controllers 11 and 12 access to it.

First, the configuration is established. In the first controller board 110, the first monitor controller 61 produces a control signal for the third controllable switch 45 conditioning it to close. The first monitor controller 61 also sends a message via the intercontroller communications path 70 to the second monitor controller 62 informing it that the first controllable switch 41 is malfunctioning. In response, the second monitor controller 62 produces respective control signals for the second and fourth controllable switches, 42 and 44, to condition them both to close. In this configuration, the first and second SCSI busses, 31 and 32 are joined into a single SCSI bus by the series connection of the second and fourth controllable switches, 42 and 44; and the first SCSI controller 11 can access the joined single SCSI bus through the third controllable switch 45.

In this configuration, both SCSI controllers, 11 and 12, are simultaneously active and controlling disk drives, 51–55, on the joined single SCSI bus. However, both the first and second SCSI controllers, 11 and 12, were originally assigned a SCSI address of 7. When the first and second SCSI controllers, 11 and 12, were controlling first and second, isolated, SCSI busses, 31 and 32, respectively, this did not create a conflict. But in this configuration, they are simultaneously operating on the same joined single SCSI bus. This creates a SCSI addressing conflict. To avoid this conflict, when the monitor controller 62 changes the configuration of the second and fourth controllable switches, 42 and 44, it also dynamically changes the SCSI address of the second SCSI controller 12 to 6 from 7, in the manner described above. With a new SCSI address of 6 (illustrated by an asterisk), the second SCSI controller 12 no longer has an address conflict with the first SCSI controller 11 and the subsystem can operate.

Because the bus address 6 must be reserved for the second SCSI controller 12, the number of disk drives which may be attached to any pair of SCSI busses in a subsystem as illustrated in FIG. 2 is decreased by one when compared with the subsystem as illustrated in FIG. 1. That is a maximum of six disk drives may be attached to a pair of SCSI busses in a narrow SCSI bus subsystem, and a maximum of fourteen disk drives may be attached to a pair of SCSI busses in a wide SCSI bus subsystem. As before, however, as many pairs of SCSI busses, with associated SCSI bus controllers, may be added as necessary to access the required number of disk drives.

Other configurations are possible for handling failures of the other controllable switches, either closed or open. One skilled in the art of peripheral control subsystem design will understand how to detect such failures, derive configurations for handling the failures and implement these configurations when such a failure is detected.

When the embodiment illustrated in FIG. 2 is operating with the SCSI busses 31 and 32 joined into a single SCSI bus, and the joined SCSI bus is being controlled by both SCSI controllers 11 and 12 simultaneously, the controlling software for the SCSI controllers 11 and 12 must be the more complex software, described above, necessary to properly implement the simultaneous control. The development and implementation of such software is more expensive than that necessary for controlling the operation of a SCSI bus with a single SCSI controller. However, the embodiment illustrated in FIG. 2 includes only two SCSI controllers, one on each controller board, instead of two on each controller board as in the prior art approach, substituting four, relatively inexpensive, controllable switches instead.

As with the prior art dual controller board approach, the embodiment illustrated in FIG. 2 allows a very high level of protection because everything in the subsystem has a duplicate capable of taking over operation in the event of a failure. But the illustrated embodiment gives the same level of redundancy as the prior art approach without the expense of two added SCSI controllers.

A peripheral device subsystem has been described above in terms of a SCSI bus disk drive subsystem adopted for RAID 5 use. This subsystem provides reliable operation of the disk drive subsystem in the event of either a disk drive failure, or a peripheral device controller failure, while requiring only the additional hardware of one or more controllable switches, which are relatively inexpensive, compared to prior approaches which required additional peripheral device controllers for redundancy. As noted above, other peripheral device busses, e.g. ESDI, and peripheral devices other than disk drives, may be used in a peripheral device subsystem in accordance with the present invention, and any number of pairs of peripheral device busses, with associated peripheral device controllers, may be included in such a subsystem.

What is claimed is:

1. A redundant peripheral device subsystem in a computer system, comprising:
   first and second peripheral device controllers;
   first and second peripheral device busses coupled to the first and second peripheral device controllers, respectively; and
   a first controllable switch, coupled between the first and second peripheral device busses, for selectively isolating the first and second peripheral device busses or joining the first and second peripheral device busses into a single peripheral device bus.

2. A redundant peripheral device subsystem in a computer system, comprising:
   first and second peripheral device controllers;
   first and second peripheral device busses coupled to the first and second peripheral device controllers, respectively; and
   a first controllable switch, coupled between the first and second peripheral device busses, for selectively isolating the first and second peripheral device busses or joining the first and second peripheral device busses into a single peripheral device bus; and
   a monitor controller, responsive to the first and second peripheral device controllers and coupled to the first controllable switch, for monitoring the first and second peripheral device controllers, and if one of the first and second peripheral controllers is malfunctioning, conditioning the first controllable switch to join the first and second peripheral device busses into a single peripheral device bus, otherwise conditioning the first controllable switch to isolate the first and second peripheral device busses.

3. The subsystem of claim 2, wherein the first controllable switch comprises a bidirectional FET switch.

4. A redundant peripheral device subsystem in a computer system, comprising:
   first and second peripheral device controllers;
   first and second peripheral device busses coupled to the first and second peripheral device controllers, respectively;
   a first controllable switch, coupled between the first and second peripheral device busses, for selectively isolating the first and second peripheral device busses or joining the first and second peripheral device busses into a single peripheral device bus;
   a second controllable switch, coupled between the first peripheral device controller and the first peripheral device bus, for selectively coupling the first peripheral device controller to or isolating the first peripheral device controller from the first peripheral device bus; and
   a third controllable switch, coupled between the second peripheral device controller and the second peripheral device bus, for selectively coupling the second peripheral device controller to or isolating the second peripheral device controller from the second peripheral device bus.

5. The subsystem of claim 4, further comprising a monitor controller, responsive to the first and second peripheral device controllers, and coupled to the first, second and third controllable switches, for monitoring the functioning of the first and second peripheral device controllers, and if one of the first and second peripheral device controllers is malfunctioning, conditioning the first controllable switch to join the first and second peripheral device busses into a single peripheral device bus and the second and third controllable switches to isolate the malfunctioning one of the peripheral device controllers from the single peripheral device bus, otherwise conditioning the first controllable switch to isolate the first and second peripheral device busses and the second and third controllable switches to couple the first and second peripheral device controllers to the first and second peripheral device busses, respectively.

6. The subsystem of claim 4, wherein the first, second and third controllable switches respectively comprise a bidirectional FET switch.

7. The subsystem of claim 1, wherein:
   the first and second peripheral device busses are SCSI busses; and
   the first and second peripheral device controllers are SCSI controllers.

8. The subsystem of claim 1, further comprising:
   a first plurality of peripheral devices coupled to the first peripheral device bus; and
   a second plurality of peripheral devices coupled to the second peripheral device bus.

9. The subsystem of claim 8, wherein:
   the first and second peripheral device busses are SCSI busses;
   the first and second peripheral device controllers are SCSI controllers; and
   the first and second plurality of peripheral devices are SCSI disk drives.

10. The subsystem of claim 9, wherein the subsystem operates as a RAID 5 disk drive subsystem.

11. A redundant peripheral device subsystem in a computer system, comprising:
    first and second peripheral device busses;
    a first controller board, comprising:
      a first peripheral device controller;
      a first controllable switch, coupled between the first peripheral device controller and the first peripheral device bus, for selectively coupling the first peripheral device controller to, or isolating the first peripheral device controller from, the first peripheral device bus; and
      a second controllable switch, coupled between the first peripheral device controller and the second peripheral device bus, for selectively coupling the first peripheral device controller to, or isolating the first peripheral device controller from, the second peripheral device bus; and a second controller board, comprising:
   a second peripheral device controller;
   a third controllable switch, coupled between the second peripheral device controller and the second peripheral device bus, for selectively coupling the second peripheral device controller to, or isolating the second peripheral device controller from, the second peripheral device bus; and
   a fourth controllable switch, coupled between the second peripheral device controller and the first peripheral device bus, for selectively coupling the second peripheral device controller to, or isolating the second peripheral device controller from, the first peripheral device bus.

12. The subsystem of claim 11, wherein:
   the first controller board further comprises a first monitor controller responsive to the first peripheral device controller and coupled to the first and second controllable switches;
   the second controller board further comprises a second monitor controller responsive to the second peripheral device controller and coupled to the third and fourth controllable switches;
   the subsystem further comprises an intercontroller communications path, coupled between the first and second monitor controllers;
   the first monitor controller monitors the first peripheral device controller, and sends a message via the intercontroller communications path to the second monitor controller when the first peripheral device controller is malfunctioning;
   the second monitor controller monitors the second peripheral device controller, and sends a message via the intercontroller communications path to the first monitor controller when the second peripheral device controller is malfunctioning;
   when the first peripheral device controller is malfunctioning, the first monitor controller conditions the first and second controllable switches to isolate the first peripheral device controller from both the first and second peripheral device busses and the second monitor controller conditions the third and fourth controllable switches to join the first and second peripheral device busses to form a single peripheral device bus, and couples the second peripheral device controller to the joined single peripheral device bus;
   when the second peripheral device controller is malfunctioning, the second monitor controller conditions the third and fourth controllable switches to isolate the second peripheral device controller from both the first and second peripheral device busses and the first monitor controller conditions the first and second controllable switches to join the first and second peripheral device busses to form a single peripheral device bus, and couples the first peripheral device controller to the joined single peripheral device bus;
   otherwise the first monitor controller conditions the first controllable switch to couple the first peripheral device controller to the first peripheral device bus and the second controllable switch to isolate the first peripheral device controller from the second peripheral device bus, and the second monitor controller conditions the third controllable switch to couple the second peripheral device controller to the second peripheral device bus and the fourth controllable switch to isolate the second peripheral device controller from the first peripheral device bus.

13. The subsystem of claim 11, wherein the first, second, third and fourth controllable switches respectively comprise a bidirectional FET switch.

14. The subsystem of claim 11, wherein:
   the first and second peripheral device busses are SCSI busses; and
   the first and second peripheral device controllers are SCSI controllers.

15. The subsystem of claim 11, wherein:
   a first plurality of peripheral devices are coupled to the first peripheral device bus; and
   a second plurality of peripheral devices are coupled to the second peripheral device bus.

16. The subsystem of claim 15, wherein:
   the first and second peripheral device busses are SCSI busses;
   the first and second peripheral device controllers are SCSI controllers; and
   the first and second plurality of peripheral devices are SCSI disk drives.

17. The subsystem of claim 16, wherein the subsystem operates as a RAID 5 disk drive subsystem.

18. In a computer system including a redundant peripheral device subsystem comprising first and second peripheral device controllers and first and second peripheral device busses, a method for operating the redundant peripheral device subsystem, comprising the steps of:
   isolating the first peripheral device bus from the second peripheral device bus;
   coupling the first peripheral device controller to the first peripheral device bus and the second peripheral device controller to the second peripheral device bus;
   monitoring the operation of the first and second peripheral device controllers to detect a malfunction in one of the first and second peripheral device controllers; and
   when a malfunction is detected in the one of the first and second peripheral device controllers:
      joining the first and second peripheral device busses into a single peripheral device bus; and
      coupling the other one of the first and second peripheral device controllers to the single peripheral device bus.

19. The method of claim 18, in which the peripheral device subsystem further comprises a controllable switch coupled between the first and second peripheral device busses, wherein:
   the isolating step comprises the step of conditioning the controllable switch to open; and
   the joining step comprises the step of conditioning the controllable switch to close.

20. In a computer system including a redundant peripheral device subsystem comprising first and second peripheral device controllers, first and second peripheral device busses, and a monitor controller coupled to the first and second peripheral device controllers, a method for operating the redundant peripheral device subsystem, comprising the steps of:
   isolating the first peripheral device bus from the second peripheral device bus;
   coupling the first peripheral device controller to the first peripheral device bus and the second peripheral device controller to the second peripheral device bus;

monitoring the operation of the first and second peripheral device controller by the monitor controller and when a normal operation is monitored in one of the first and second peripheral device controllers, detecting a malfunction in the one of the first and second peripheral device controllers; and when a malfunction is detected in the one of the first and second peripheral device controllers:
joining the first and second peripheral device busses into a single peripheral device bus; and
coupling the other one of the first and second peripheral device controllers to the single peripheral device bus.

21. In a computer system including a redundant peripheral device subsystem comprising first and second peripheral device controllers, first and second peripheral device busses, and a monitor controller coupled to the first and second peripheral device controllers, a method for operating the redundant peripheral device subsystem, comprising the steps of:

isolating the first peripheral device bus from the second peripheral device bus;

coupling the first peripheral device controller to the first peripheral device bus and the second peripheral device controller to the second peripheral device bus;

monitoring the operation of the first and second peripheral device controllers by the monitor controller and when an abnormal operation is monitored in one of the first and second peripheral device controllers, detecting a malfunction in the one of the first and second peripheral device controllers; and when a malfunction is detected in one of the first and second peripheral device controllers,
isolating the one of the first and second peripheral device controllers from the single peripheral device bus;
joining the first and second peripheral device busses into a single peripheral device bus; and
coupling the other one of the first and second peripheral device controllers to the single peripheral device bus.

22. The method of claim 21 in which the peripheral device subsystem further comprises a first controllable switch coupled between the first peripheral device controller and the first peripheral device bus, and a second controllable switch coupled between the second peripheral device controller and the second peripheral device bus, wherein:

the coupling step comprises the step of conditioning both of the first and second controllable switches to close; and the step of isolating the one of the first and second peripheral device controllers from the single peripheral device bus comprises the step of conditioning the one of the first and second controllable switches coupled to the one of the first and second peripheral device controllers to open.

23. In a computer system including a redundant peripheral device subsystem comprising first and second peripheral device controllers, first and second peripheral device busses, a first controllable switch coupled between the first peripheral device controller and the first peripheral device bus, a second controllable switch coupled between the second peripheral device controller and the second peripheral device bus, a third controllable switch coupled between the first peripheral device controller and the second peripheral device bus, and a fourth controllable switch coupled between the second peripheral device controller and the first peripheral device bus; a method for operating the redundant peripheral device subsystem, comprising the steps of:

isolating the first peripheral device bus from the second peripheral device bus by conditioning the third and fourth controllable switches to open;

coupling the first peripheral device controller to the first peripheral device bus and the second peripheral device controller to the second peripheral device bus by conditioning the first and second controllable switches to close;

monitoring the operation of the first and second peripheral device controllers to detect a malfunction in one of the first and second peripheral device controllers; and when a malfunction is detected in the one of the first and second peripheral device controllers:
joining the first and second peripheral device busses into a single peripheral device bus by conditioning the ones of the controllable switches coupled to the one of the peripheral device controllers to open, and the other ones of the controllable switches to close; and
coupling the other one of the first and second peripheral device controllers to the single peripheral device bus.

24. In a computer system including a redundant peripheral device subsystem comprising first and second peripheral device controllers, first and second peripheral device busses, a first monitor controller coupled to the first peripheral device controller, and a second monitor controller coupled to the second peripheral device controller and to the first monitor controller, a method for operating the redundant peripheral device subsystem, comprising the steps of:

isolating the first peripheral device bus from the second peripheral device bus;

coupling the first peripheral device controller to the first peripheral device bus and the second peripheral device controller to the second peripheral device bus;

monitoring the operation of the first and second peripheral device controllers to detect a malfunction in one of the first and second peripheral device controllers by:
monitoring the operation of the first peripheral device controller by the first monitor controller;
when an abnormal operation is monitored in the first peripheral device controller, detecting a malfunction of the first peripheral device controller and reporting it to the second monitor controller;
monitoring the operation of the second peripheral device controller by the second monitor controller; and
when an abnormal operation is monitored in the second peripheral device controller, detecting a malfunction of the second peripheral device controller and reporting it to the first monitor controller; and when a malfunction is detected in the one of the first and second peripheral device controllers:
joining the first and second peripheral device busses into a single peripheral device bus; and
coupling the other one of the first and second peripheral device controllers to the single peripheral device bus.

25. The method of claim 24, in which the peripheral device subsystem further comprises a first controllable switch coupled between the first peripheral device controller and the first peripheral device bus, a second controllable switch coupled between the second peripheral device controller and the second peripheral device bus, a third controllable switch coupled between the first peripheral device controller and the second peripheral device bus, and a fourth controllable switch coupled between the second peripheral device controller and the first peripheral device bus, wherein:

the isolating step comprises the steps of:
conditioning the third controllable switch to open by the first monitor controller; and
conditioning the fourth controllable switch to open by the second monitor controller; the coupling step comprises the steps of:
conditioning the first controllable switch to close by the first monitor controller; and
conditioning the second controllable switch to close by the second monitor controller; and when a malfunction is detected in the one of the first and second peripheral device controllers:

the coupling step comprises the steps of:
conditioning the ones of the controllable switches coupled to the one of the peripheral device controllers to open by the one of the monitor controllers coupled to the one of the peripheral device controllers, in response to the detection of a malfunction by the one of the peripheral device controllers; and the joining step comprises the steps of:
conditioning the other ones of the controllable switches to close by the other one of the monitor controllers, in response to the report of a malfunction from the one of the monitor controllers.

* * * * *